United States Patent [19]

Schlichenmaier et al.

[11] Patent Number: 5,579,235
[45] Date of Patent: Nov. 26, 1996

[54] METHOD OF MONITORING RPM SENSORS

[75] Inventors: Andreas Schlichenmaier, Zaberfeld.Leonbronn; Klaus Haefele, Leutenbach; Ulrich Schwabe, Ditzingen; Christian Dittmar, Korntal; Martin Blanc, Knittlingen-Kleinvillars; Thomas Purat, Asperg, all of Germany

[73] Assignee: Robert Bosch GmbH, Stuttgart, Germany

[21] Appl. No.: 318,740

[22] PCT Filed: Mar. 18, 1993

[86] PCT No.: PCT/DE93/00249

§ 371 Date: Oct. 7, 1994

§ 102(e) Date: Oct. 7, 1994

[87] PCT Pub. No.: WO93/20452

PCT Pub. Date: Oct. 14, 1993

[30] Foreign Application Priority Data

Apr. 7, 1992 [DE] Germany ............... 42 11 622.8

[51] Int. Cl.$^6$ ..................................... G06F 7/70
[52] U.S. Cl. ........................... 364/483; 364/426.02
[58] Field of Search .................... 364/481–487, 364/551.01, 426.02; 303/122–122.15; 388/831; 363/50

[56] References Cited

U.S. PATENT DOCUMENTS

| | | | |
|---|---|---|---|
| 4,635,508 | 1/1987 | Tatsumi | 364/424.1 |
| 4,722,576 | 2/1988 | Matsuda | 303/92 |
| 5,109,675 | 5/1992 | Hwang | 60/660 |
| 5,291,578 | 3/1994 | Kalami | 388/831 |
| 5,341,282 | 8/1994 | Brambilla et al. | 363/50 |
| 5,406,485 | 4/1995 | Wise et al. | 364/426.02 |

Primary Examiner—James P. Trammell
Attorney, Agent, or Firm—Michael J. Striker

[57] ABSTRACT

A process for monitoring several inductive rpm sensors includes superposing a direct current voltage on an alternating voltage signal from one rpm sensor in one rpm sensor circuit to form a combined voltage signal and monitoring a voltage level of the combined voltage signal at a monitoring point in the one rpm sensor circuit to detect a fault such as a break in a sensor feed line. To detect short circuits between rpm sensors and/or their feed lines, the process also includes changing the voltage level at the monitoring point of the one rpm sensor by feeding a test voltage pulse to a pole of the one rpm sensor during a predetermined time interval in a test stage and monitoring a voltage level at a monitoring point of at least one other rpm sensor and/or its feed lines in at least one other rpm sensor circuit to determine if a change in the voltage level at the monitoring point of the at least one other rpm sensor occurs during the predetermined time interval in which the voltage level is changed at the monitoring point of the one rpm sensor in the one rpm sensor circuit.

2 Claims, 1 Drawing Sheet

METHOD OF MONITORING RPM SENSORS

This application is a 371 of PCT/DE93/00249 filed Mar. 18, 1993.

BACKGROUND OF THE INVENTION

The present invention relates to a method of monitoring rpm sensors and, more particularly, to a method which specifically detects short circuits between rpm sensors and their feed lines.

In known error detection circuits for inductive rpm sensors, a defective rpm sensor caused by an open line or a short circuit in the power line can be detected by monitoring a voltage level triggered by a superposed direct current. However it is desirable to improve the known method of testing individual rpm sensors and their sensor circuits by specifically monitoring to detect short circuits between rpm sensors and/or their feed lines.

SUMMARY OF THE INVENTION

It is an object of the present invention to provide an improved method of monitoring a plurality of rpm sensors by which short circuits between rpm sensors and/or their feed lines are detected.

This object and others which will become more apparent hereinafter are attained in a method for monitoring a plurality of rpm sensors comprising superposing a direct current voltage on an alternating voltage signal from one rpm sensor in one rpm sensor circuit to form a combined voltage signal and monitoring a voltage level of the combined voltage signal at a monitoring point of the one rpm sensor in one rpm sensor circuit to detect an error.

According to the invention, the method for monitoring the rpm sensors is improved by changing the voltage level at the monitoring point of the one rpm sensor by feeding a test voltage pulse to a pole of the one rpm sensor for a predetermined time interval during a test stage; and monitoring a voltage level at a monitoring point of at least one other rpm sensor and/or its feed lines in the at least one other rpm sensor circuit to determine if the voltage level at the monitoring point of the at least one other rpm sensor changes when the voltage level is changed at the monitoring point of the one rpm sensor in the one rpm sensor circuit and thus to determine if and when a short circuit exists between the at least one other rpm sensor and the one rpm sensor.

In a preferred embodiment of the invention the one rpm sensor circuit is not monitored for the fault during the predetermined time interval during the test stage.

BRIEF DESCRIPTION OF THE DRAWING

The objects, features and advantages of the present invention will now be illustrated in more detail by the following detailed description, reference being made to the accompanying drawing in which.

DESCRIPTION OF THE PREFERRED EMBODIMENT

Figure 1:
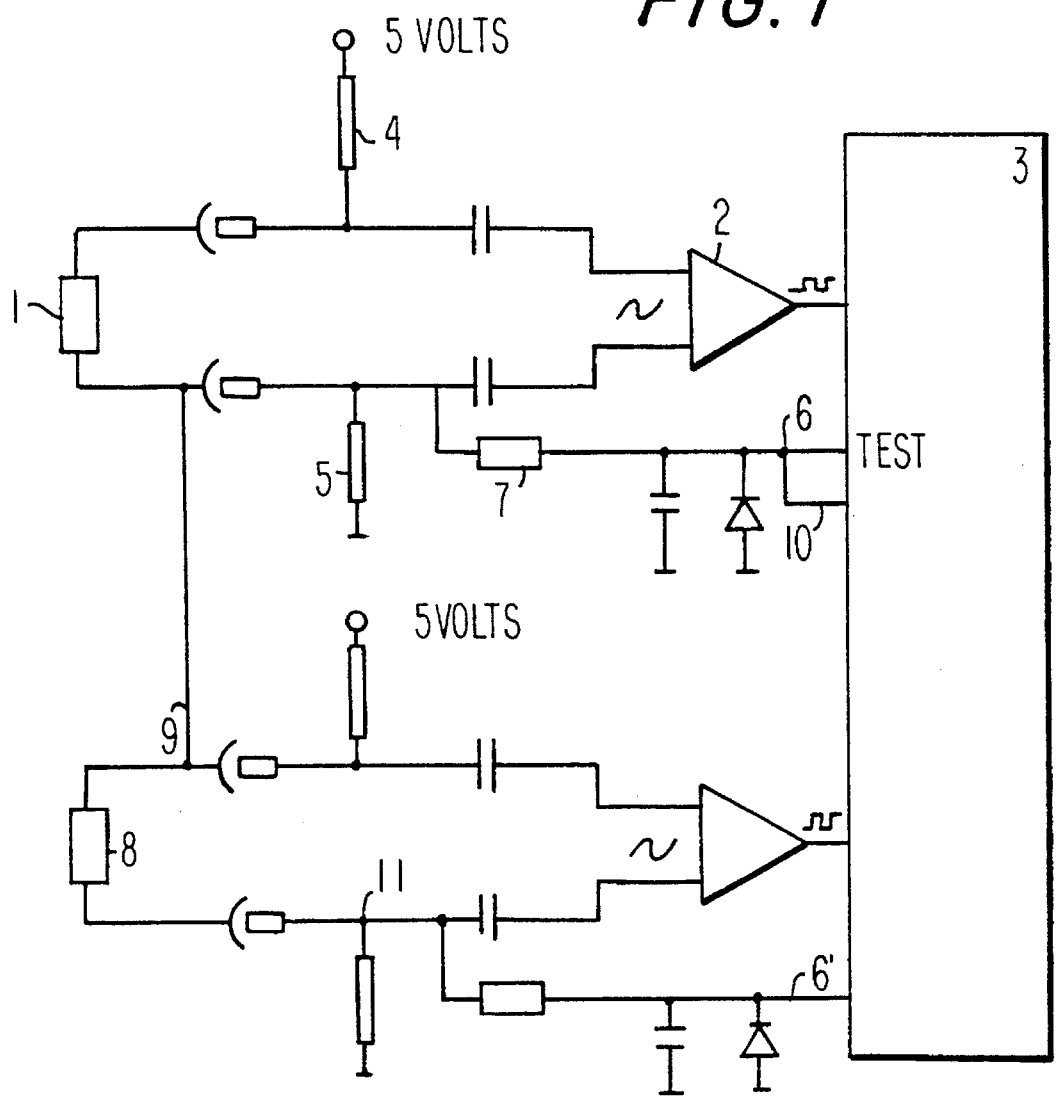
FIG. 1 is a schematic circuit diagram of circuitry for performing a method of monitoring plural rpm sensors according to the invention, this circuitry being shown with a short circuit indicated between individual rpm sensor circuits with a dashed line.

FIG. 1 shows circuitry for performing one embodiment of a method of monitoring two rpm sensors 1,8 according to the invention to detect a short circuit between the rpm sensors and/or their feed lines 14,14'. The one rpm sensor circuit 20 shown in the upper part of FIG. 1 includes one rpm sensor 1, while the other rpm sensor circuit 22 shown in the bottom part of FIG. 1 includes another rpm sensor 8. In the one rpm sensor circuit 20 shown in FIG. 1 the amplifier 2 converts the sine-wave or alternating voltage signal from the rpm sensor 1 to a square-wave voltage. The output of the amplifier 2 is connected to a microprocessor 3. The rpm sensor 1 is connected in a voltage divider with two additional resistors 4 and 5 for monitoring. The microprocessor monitors the voltage level by means of a line 6 with a resistor 7 at the point CP of connection between the rpm sensor 1 and resistor 7. The voltage level at the connection point CP changes when there is a break in the line or a short circuit in the power line. The microprocessor 3 detects this level change and alerts and/or switches off the system (e.g., an antilock braking system).

The other rpm sensor circuit 22 in the bottom half of FIG. 1 contains essentially the same components connected electrically in the same way as the rpm sensor circuit 20 in the upper half of FIG. 1. For example, similar amplifier 2' is present in the other rpm sensor circuit 22 for the alternating voltage signal from the rpm sensor 8. The known circuit 22 by itself can not detect a short circuit between the rpm sensors and their feed lines as is indicated in FIG. 1 by dashed line 9. Providing the connection between rpm sensor circuits 20 and 22 indicated by dashed line 9 is of course not part of the method of the invention and represents the short circuit which the improved method of the inventions is designed to detect.

According to the invention, the microprocessor 3 deliberately changes the voltage level at the connection CP point between the rpm sensor 1 and resistor 7 periodically via a test line 10. In the event of a short circuit, the level at the connection point 11 of the lower rpm sensor circuit 22 for the rpm sensor 8 will also change and the microprocessor 3 detects this as a break via line 6'. The monitoring via line 6 of the upper rpm sensor circuit 20 for the rpm sensor 1 must be suppressed during the test.

Figure 2:
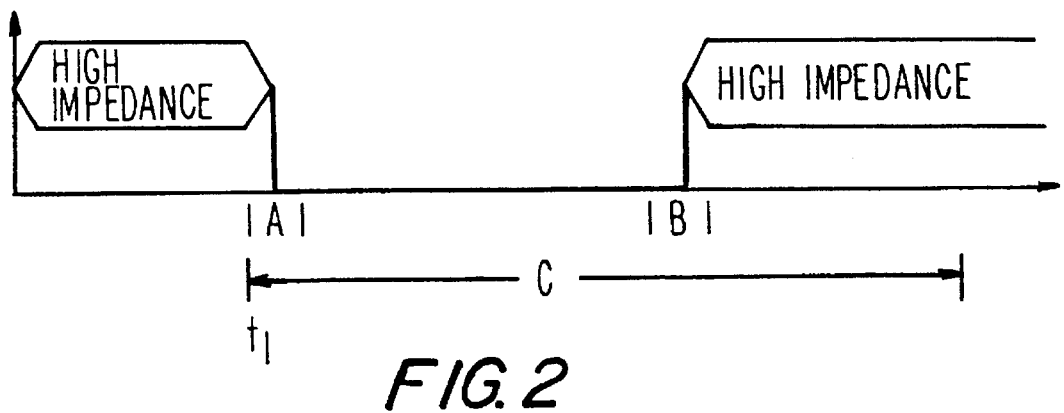
FIG. 2 is a graphical illustration of the voltage at a connection or monitoring point of one rpm sensor circuit during the testing process for the short circuit.

FIG. 2 shows a diagram pertaining to the testing process. The connection point CP between the rpm sensor 1 and the resistor 7 is at high potential until $t_1$. At this point, the level is brought to 0 via line 10. Measurement of speed is blocked in the transition areas A and B to avoid errors. Further, detection of open circuits is suppressed in phase C. Assuming a short circuit, the microprocessor detects this short circuit due to a change in the level during the test pulse, e.g., 300 ms, via line 6'.

In operation, as is apparent from the circuitry shown in the drawing, the test pulse is fed over line 10 via the resistance 7 to the sensor 1 via the connection point CP. If there is no short circuit indicated by dashed line 9 present during the test pulse, then a voltage level change does not occur at monitoring point 11 of the lower rpm sensor circuit 22. However if there is a short circuit 9 present, then a connection between the rpm sensor 1 and the rpm sensor 8 and the sensor circuits 20 and 22 exists, so that a change in the voltage level at the connection point CP changes the voltage at sensor 8 and also at monitoring point 11. The short circuit is detected because the monitoring of the rpm sensor circuit 22 over line 6' continues during the test pulse.

We claim:

1. In a process for monitoring a plurality of rpm sensors, said process comprising the steps of superposing a direct current voltage on an alternating voltage signal from one rpm sensor in one rpm sensor circuit to form a combined voltage signal and monitoring a voltage level of the combined voltage signal at a monitoring point in the one rpm sensor circuit to detect a fault, the improvement comprising changing the voltage level at the monitoring point in the one rpm sensor circuit by feeding a test voltage pulse to a pole of the one rpm sensor during a predetermined time interval in a test stage; and monitoring a voltage level at a monitoring point of at least one other rpm sensor in at least one other rpm sensor circuit to determine if the voltage level at the monitoring point in the at least one other rpm sensor circuit changes during the predetermined time interval in which the voltage level is changed at the monitoring point in the one rpm sensor circuit and thus to determine when a short circuit exists between the at least one other rpm sensor and the one rpm sensor.

2. The improvement as defined in claim 1, further comprising not monitoring the one rpm sensor circuit to detect said fault during the predetermined time interval but performing said monitoring of the one rpm sensor circuit for said fault prior to said predetermined time interval.

* * * * *